US008554277B2

(12) United States Patent
Franzon et al.

(10) Patent No.: US 8,554,277 B2

(45) Date of Patent: Oct. 8, 2013

(54) MICROWAVE TRANSMISSION ASSEMBLY

(75) Inventors: Bosse Franzon, Bro (SE); Jan-Erik Lundeberg, Sollentuna (SE); Rune Johansson, Upplands Väsby (SE); Torbjorn Lindh, Huddinge (SE); Claudia Muniz Garcia, Stockholm (SE); John David Rhodes, Menston (GB)

(73) Assignee: Filtronic Wireless Limited, Shirley (GB)

( * ) Notice: Subject to any disclaimer, the term of this patent is extended or adjusted under 35 U.S.C. 154(b) by 0 days.

(21) Appl. No.: 13/511,978

(22) PCT Filed: Nov. 23, 2010

(86) PCT No.: PCT/SE2010/051293

§ 371 (c)(1), (2), (4) Date: Aug. 9, 2012

(87) PCT Pub. No.: WO2011/065904

PCT Pub. Date: Jun. 3, 2011

(65) Prior Publication Data

US 2012/0309458 A1 Dec. 6, 2012

(30) Foreign Application Priority Data

| | | |
|---|---|---|
| Nov. 24, 2009 | (GB) | 0920545.1 |
| Jan. 25, 2010 | (GB) | 1001150.0 |
| Mar. 8, 2010 | (GB) | 1003764.6 |
| Mar. 11, 2010 | (GB) | 1004062.4 |
| Mar. 16, 2010 | (GB) | 1004129.1 |

(51) Int. Cl.
*H04M 1/00* (2006.01)
*H04B 1/38* (2006.01)

(52) U.S. Cl.
USPC .............. 455/561; 455/84; 455/107; 333/124

(58) Field of Classification Search
USPC ............. 455/84, 107, 129, 550.1, 552.1, 561; 333/124
See application file for complete search history.

(56) References Cited

U.S. PATENT DOCUMENTS

| | | | | |
|---|---|---|---|---|
| 6,141,538 A * | 10/2000 | Consolazio et al. | ............ | 455/68 |
| 7,058,373 B2 * | 6/2006 | Grigore | ...................... | 455/127.1 |
| 7,583,940 B2 * | 9/2009 | Matsuura et al. | ............. | 455/108 |
| 7,620,371 B2 * | 11/2009 | Zolfaghari | ...................... | 455/69 |
| 8,380,140 B2 * | 2/2013 | Utagawa et al. | ................ | 455/84 |

* cited by examiner

*Primary Examiner* — Nhan Le
(74) *Attorney, Agent, or Firm* — Howard & Howard Attorneys PLLC

(57) ABSTRACT

A microwave transmission assembly comprising a combiner comprising first and second input ports and internal and external output a ports; the combiner being adapted to transfer a signal received at microwave frequency $f_1$ at the first input port to the external output port and signals received at other frequencies to the internal output port; the combiner being further adapted to transfer a signal at a microwave frequency $f_2$ at the second input port to the external output port and signals received at the other frequencies to the internal output port; a resistive load connected to the internal output port; and, a power dependent reflective load connected in series with the resistive load, the power dependent reflective load comprising a reactive element, the reactive element comprising an inductive component and a capacitive component and being adapted to resonate at a load frequency; the impedance of the capacitive component being adapted to drop when the incident microwave power received by the power dependent reflective load exceeds a power limit so switching the power dependent load from a low impedance state to a high impedance state.

17 Claims, 12 Drawing Sheets

| Pin VNA (arbitrary) | Forward Power | Reverse Power | Scalar Return Loss |
|---|---|---|---|
| dBm | W | W | dB |
| -10 | 2.34 | 0.451 | 7.15 |
| -9 | 2.92 | 0.556 | 7.20 |
| -8 | 3.64 | 0.685 | 7.25 |
| -7 | 4.40 | 0.836 | 7.21 |
| -6 | 5.36 | 1.02 | 7.21 |
| -5 | 6.60 | 1.25 | 7.23 |
| -4 | 7.83 | 1.53 | 7.09 |
| -3 | 9.60 | 5.0 | 2.83 |
| -2 | 11.1 | 6.14 | 2.57 |

*Figure 4(a)*

Change in return loss with respect to input power for prototype network

| Pin ESG (arbitrary) | Forward Power | Reverse Power | Scalar Return Loss | Forward Power | Return Power | Scalar Return Loss |
|---|---|---|---|---|---|---|
| | CW | CW | CW | WCDMA | WCDMA | WCDMA |
| dBm | W | W | dB | W | W | dB |
| -5.1 | 7.12 | 0.796 | 9.51566926 | 6.9 | 0.783 | 9.450873 |
| -5 | 7.03 | 0.791 | 9.48778842 | 7.06 | 0.803 | 9.440892 |
| -4.9 | 7.19 | 0.805 | 9.5093301 | 7.2 | 0.838 | 9.340885 |
| -4.8 | 7.3 | 0.821 | 9.48979703 | 7.31 | 3.82 | 2.81854 |
| -4.7 | 7.41 | 3.78 | 2.92326408 | 7.43 | 3.85 | 2.855281 |
| -4.6 | 7.55 | 3.91 | 2.85770194 | 7.6 | 3.93 | 2.86421 |

*Figure 5(a)*

| Pin ESG (arbitrary) | Forward Power | Reverse Power | Scalar Return Loss | Forward Power | Reverse Power | Scalar Return Loss |
|---|---|---|---|---|---|---|
| | CW | CW | CW | WCDMA | WCDMA | WCDMA |
| dBm | W | W | dB | W | W | dB |
| -5.1 | 7.46 | 0.826 | 9.56 | 7.3 | 0.905 | 9.14 |
| -5.0 | 7.65 | 0.851 | 9.54 | 7.4 | 4.02 | 2.65 |
| -4.9 | 7.61 | 0.860 | 9.47 | 7.53 | 4.06 | 2.68 |
| -4.8 | 7.73 | 3.92 | 2.95 | 7.66 | 4.13 | 2.68 |
| -4.7 | 7.84 | 3.97 | 2.96 | 7.77 | 4.20 | 2.67 |
| -4.6 | 7.96 | 4.02 | 2.97 | 7.9 | 4.30 | 2.64 |

*Figure 6(a)*

Before and after duration test (Fc = 1900 Mhz)

*Single tone 8.5dB PAR

MICROWAVE TRANSMISSION ASSEMBLY

RELATED APPLICATIONS

This application claims priority to and all the advantages of International Patent Application No. PCT/SE2010/051293, filed Nov. 23, 2010, with the World Intellectual Property Organization, which claims priority to Great Britain Patent Application No. 0920545.1, filed on Nov. 24, 2009, Great Britain Patent Application No. 1001150.0, filed on Jan. 25, 2010, Great Britain Patent Application No. 1003764.6, filed on Mar. 8, 2010, Great Britain Patent application 1004062.4, filed on Mar. 11, 2010, and Great Britain Patent Application No. 1004129.1 filed on Mar. 16, 2010. All of these applications are hereby expressly incorporated by reference.

The present invention relates to a microwave transmission assembly. More particularly, but not exclusively, the present invention relates to a microwave transmission assembly comprising a combiner connected to a plurality of basestations for combining the signals from the basestations and passing them to an antennae for transmission, the combiner further comprising a power dependent reflective load for reflecting the power provided by at least one basestation back to the basestation rather than the antennae if the basestation is incorrectly connected to the combiner.

Basestations for generating microwave signals are known in the field of mobile telephony. Such basestations are connected to an antenna for transmitting the signals generated by the basestations to mobile telephones.

Often a plurality of basestations is connected to a single antenna. Each of the basestations may generate a microwave signal at a different frequency and different modulation scheme as is known in the art. In this case each of the plurality of basestations is connected to an associated input port of a combiner. The combiner combines the signals from the input ports together and presents them at an output port which is in turn connected to the antenna.

It is possible that the basestations may be incorrectly connected to the combiner. For example a basestation adapted to generate a signal at one frequency may be accidentally connected to an input port of the combiner adapted to receive a signal at a different frequency. In such cases the combiner delivers the power from the incorrectly connected basestation to an internal load.

If some or all of the power from a basestation is delivered to an internal load in the combiner then the apparatus will not operate correctly or possibly not at all. It can be difficult to determine the cause of this problem with complex diagnostic systems being required.

The microwave transmission apparatus according to the invention seeks to overcome the problems of the prior art.

Accordingly, the present invention provides A microwave transmission assembly comprising a combiner comprising first and second input ports and internal and external output ports;

the combiner being adapted to transfer a signal received at microwave frequency $f_1$ at the first input port to the external output port and signals received at other frequencies to the internal output port;

the combiner being further adapted to transfer a signal at a microwave frequency $f_2$ at the second input port to the external output port and signals received at the other frequencies to the internal output port;

a resistive load connected to the internal output port; and, a power dependent reflective load connected in series with the resistive load, the power dependent reflective load comprising a reactive element, the reactive element comprising an inductive component and a capacitive component and being adapted to resonate at a load frequency;

the impedance of the capacitive component being adapted to drop when the incident microwave power received by the power dependent reflective load exceeds a power limit so switching the power dependent load from a low impedance state to a high impedance state.

If the basestation is incorrectly connected to the combiner of the assembly then the power transmitted to the power dependent load (the incident microwave power) will increase. This causes the magnitude of the capacitive component of the reactive element to drop, so switching the power dependent reflective load from a low impedance state to a high impendence state. This causes the power to be reflected back to the incorrectly connected basestation so providing an immediate indication that the basestation has been incorrectly connected to the combiner.

Preferably, the magnitude of the impedance of the capacitive component is adapted to drop by at least one order of magnitude, preferably at least two orders of magnitude when the incident microwave power exceeds the power limit.

Preferably, the impedance of the capacitive component is adapted to drop substantially to zero when the incident microwave power exceeds the power limit.

Preferably, the microwave transmission assembly further comprises an antenna for transmitting a microwave signal, the antenna being connected to the external output port.

Preferably, at least one of the input ports has a basestation connected thereto, the basestation being adapted to provide a microwave signal to the combiner.

Preferably, the power limit is at least 10% and less than 90% of the power of the microwave signal generated by the basestation, preferably greater than 20% and less than 75%.

The base station can comprise a detector for detecting power reflected from the combiner.

The basestation can be adapted to provide a modulated microwave signal, preferably a GSM, W-CDMA, or LTE modulated signal.

Preferably, the reactive element can be modelled as a capacitor and an inductor in series, the impedance of the capacitor being adapted to drop in value, preferably to become a short circuit, at powers above the power limit.

The reactive element can comprise an inductor and a capacitor in series, the impedance of the capacitor being adapted to drop in value, preferably to become a short circuit, at powers above the power limit.

Preferably, the reactive element comprises a gas discharge tube.

Preferably, the power dependent reflective load further comprises a tuning inductor in series with the reactive element.

The microwave transmission assembly can further comprise an additional capacitor connected in parallel with the power dependent reflective load.

The additional capacitor can be connected in parallel with the reactive element and the tuning inductor.

The power dependent reflective load can comprise a semiconductor device.

The power dependent reflective load can further comprise a step recovery diode.

Preferably, the inductance of the power dependent reflective load is at least one order of magnitude, preferably at least two orders of magnitude larger than the resistance of the resistive load.

The present invention will now be described by way of example only, and not in any limitative sense, with reference to the accompanying drawings in which FIG. 1 shows a known microwave transmission assembly;

FIG. 2 shows a microwave transmission assembly according to the invention;

FIGS. 3(*a*) and 3(*b*) show a power dependent reflective load of an assembly according to the invention and an apparatus for testing such a load;

FIGS. 4(*a*) and 4(*b*) show a first test on the load of FIG. 3(*a*);

FIGS. 5(*a*) and 5(*b*) show the result of a further test on the load of FIG. 3(*a*);

FIGS. 6(*a*) and 6(*b*) show the results of a further test on the load of FIG. 3(*a*);

Figure 1:
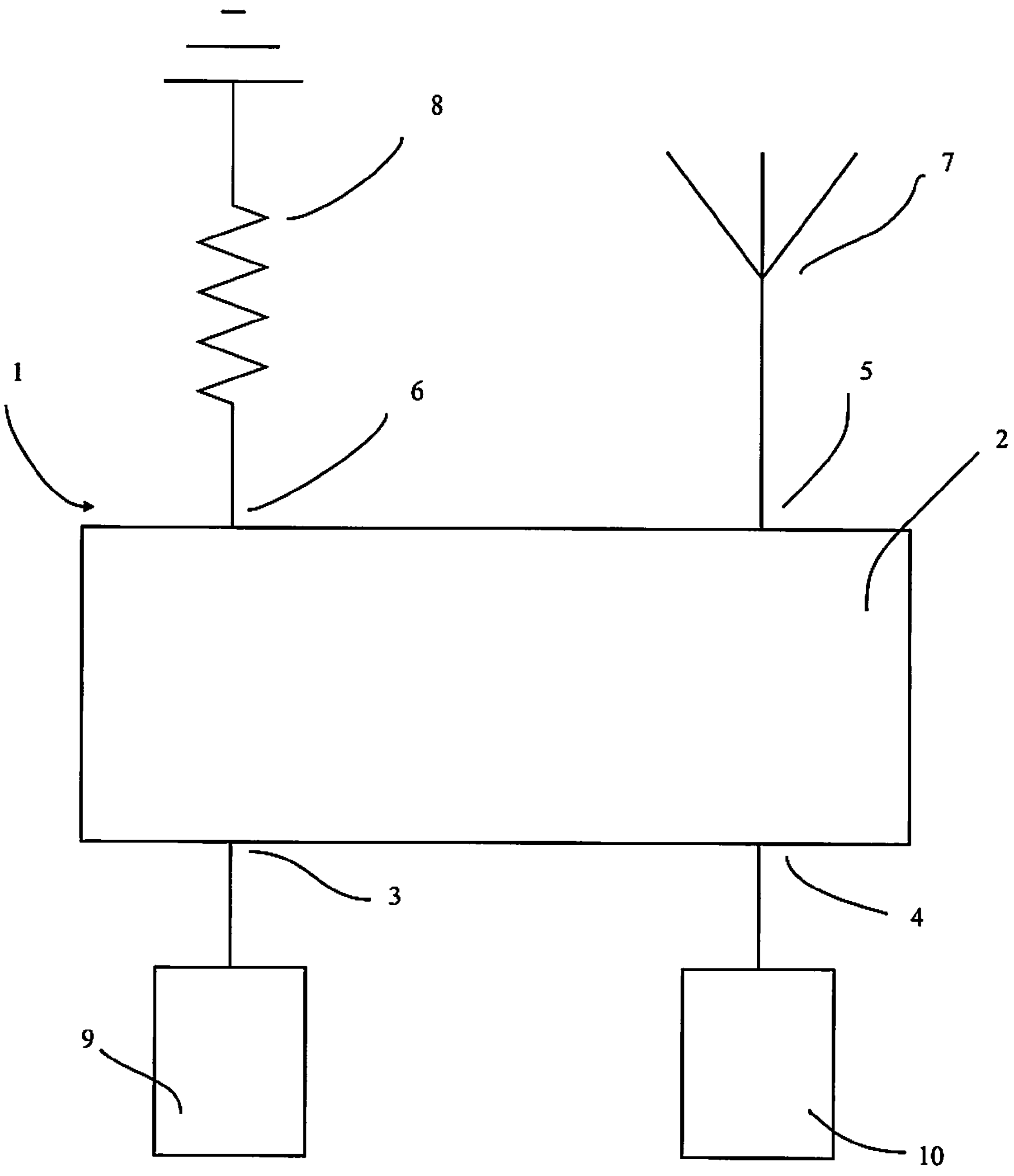

Shown in FIG. 1 is a known microwave transmission assembly 1. The transmission assembly 1 comprises a combiner 2 having first and second input ports 3,4 and external and internal output ports 5,6. Connected to the external output port 5 is an antenna 7 suitable for transmitting a microwave signal. Connected to the internal output port 6 is a resistive load 8.

Connected to the first input port 3 is a first basestation 9. In use the first basestation 9 generates a microwave signal at a frequency $f_1$. Typically this is modulated according to a modulation scheme, for example W-CDMA modulation, as is known in the art. The combiner 2 receives this modulation signal and transfers it to the antenna 7. Connected to the second input port 4 is a second basestation 10. The second basestation 10 also generates a microwave signal which is received by the combiner 2, combined with the first signal, and passed to the antenna 7. The microwave signal generated by the second basestation 10 is typically of a different frequency $f_2$ and modulated according to a different modulation scheme than the first microwave signal.

The combiner 2 expects to receive a particular frequency signal at each input port 3,4. If a basestation 9,10 is connected to the wrong port 3,4 or is set to provide the incorrect microwave frequency then the combiner 2 will not pass the microwave signal to the antenna 7. Instead, the combiner 2 passes the signal to the internal resistive load 8 where it is dissipated. The combiner 2 may be designed to generate an alarm to indicate that this is occurring although known methods for doing so are typically complex and can be difficult to implement. This is particularly so since the alarm must operate reliably over a wide range of temperature so requiring temperature compensated electronics.

Figure 2:
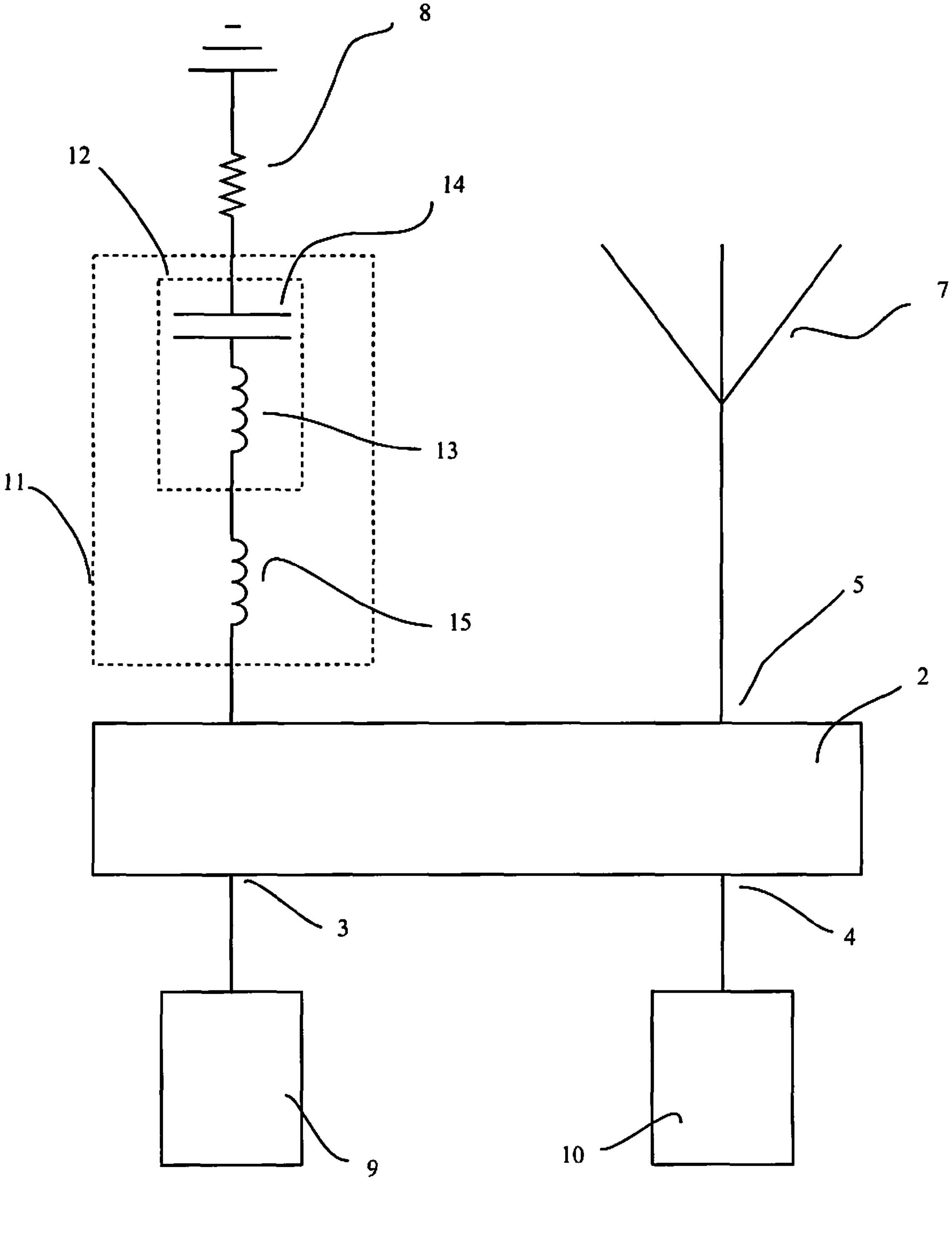

Shown in FIG. 2 is a microwave transmission apparatus 1 according to the invention. The apparatus 1 is similar to that of FIG. 1 except a power dependent reflective load 11 is included in series with the resistive load 8. In this embodiment the power dependent reflective load 11 comprises a reactive element 12. The reactive element 12 comprises an inductive component and a capacitive component (that is to say that the complex impedance of the reactive element includes inductive and capacitive terms). In this embodiment the reactive element 12 is a gas discharge tube (shown schematically as a dotted square) which may be modelled in an equivalent circuit as capacitor 14 and inductor 13 in series. The reactive element 12 naturally resonates at a load frequency. The power dependent reflective load 11 further comprises a tuning inductor 15 connected in series with the reactive element 12. The tuning inductor 15 is employed to ensure the power dependent reflective load 11 resonates at a frequency proximate to the frequencies f1 and f2.

As before when the basestations 9,10 are correctly connected to the combiner 2 signals are passed from the basestations 9,10 through the combiner 2 to the antenna 7. Even in correct operation the combiner 2 may pass a small amount of power to the internal output port 6 at frequencies at or close to $f_1$ or $f_2$. At these low powers the power dependent reflective load 11 is in a low impedance state. In this state the voltage across the inductive component 13 of the reactive element 12 and tuning inductor 15 is substantially 180 degrees out of phase with the voltage across the capacitive component 14. The effective impedance of the power dependent reflective load 11 and resistive load 8 in series is therefore substantially the resistive load 8 only. The value of the resistive load 8 is chosen such that this small amount of power is dissipated in the resistive load 8.

If a basestation 9,10 is incorrectly connected to the combiner then the signal generated by the basestation 9,10 is passed to the internal output port 6 and hence to the power dependent reflective load 11 and resistive load 8. If the power generated by the basestation 9,10 which is received by the power dependent reflective load 11 exceeds a power limit then the effective impedance of the capacitive component 14 of the gas discharge tube 12 drops substantially to zero, so switching the power dependent reflective load 11 to a high impedance state in which its impedance is essentially that of the inductive component 13 of the tube 12 in series with the tuning inductor 15. The value of the inductance of the power dependent reflective load 11 is preferably at least one, more preferably at least two orders of magnitude larger than the value of the resistive load 8. The effective impedance of the power dependent reflective load 11 and resistive load 8 in series is therefore substantially the inductance component 13,15 of the power dependent reflective load 11. This power is therefore reflected back to the combiner 2 and hence to the incorrectly connected basestation 9,10.

In this embodiment, the power dependent reflective load 11 is adapted such that the power level is less than the power generated by at least one correctly connected basestation 9,10. It therefore switches from the low impedance state to the high impedance state or receiving the power generated by an incorrectly connected basestation 9,10. Preferably the power level is more than 10% and less than 90% of the power in the microwave signal generated by the basestation 9,10. More preferably it is more than 20% and less than 75%.

A typical basestation 9,10 generates an average power of the order 100 W. The power level at which the power dependent reflective load 11 changes from the low impedance state to the high impedance state is therefore typically in the range 10 to 90 W, preferably in the range 20 to 75 W for an incorrectly connected basestation 9,10.

It is not strictly necessary that the impedance of the capacitive component 14 drops substantially to zero. It is merely necessary that its magnitude drops compared to that of the inductive component 13. The magnitude of the impedance of the capacitive component 14 could for example drop by one order of magnitude, preferably two orders of magnitude.

Figure 3:
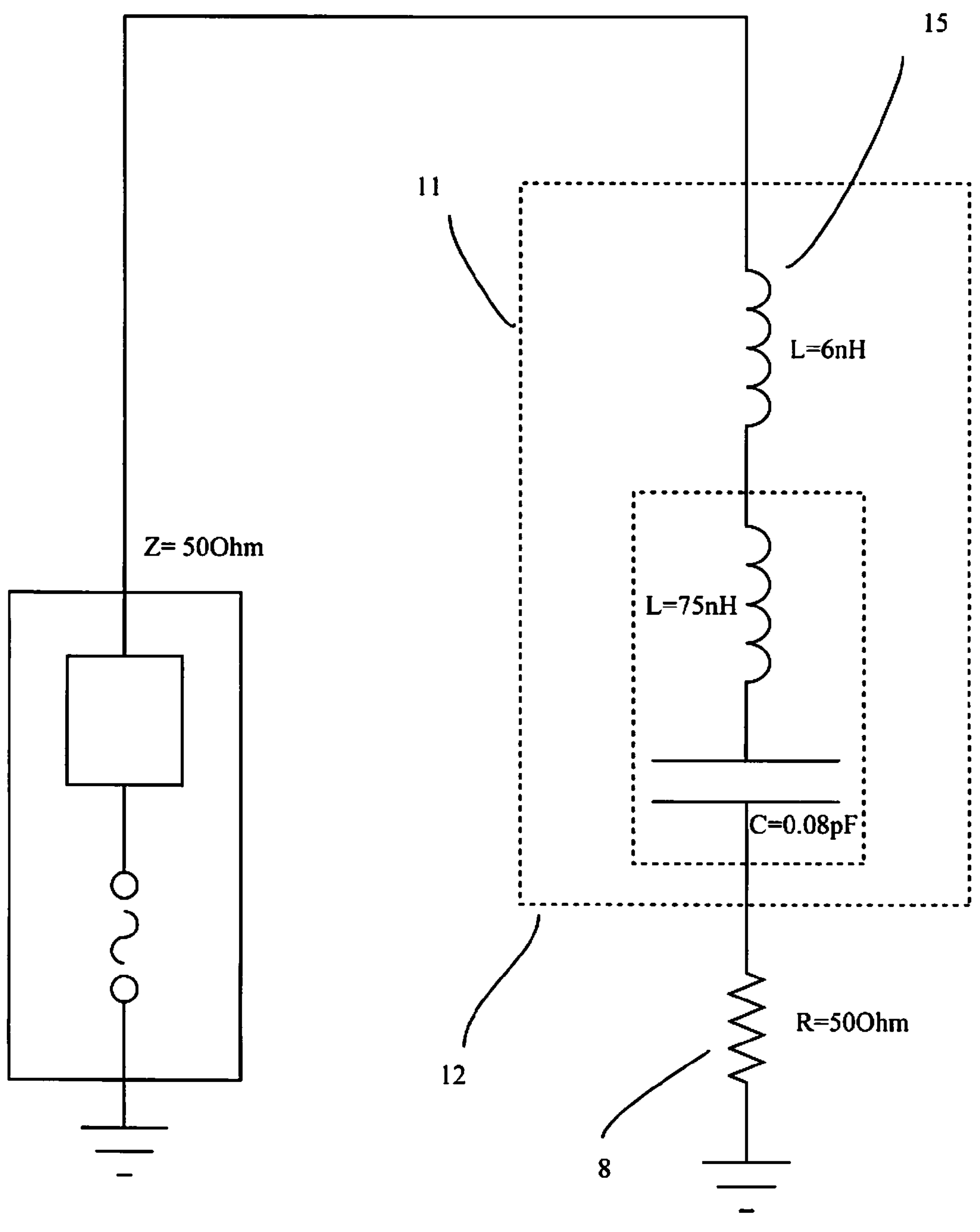
Figure 3B:
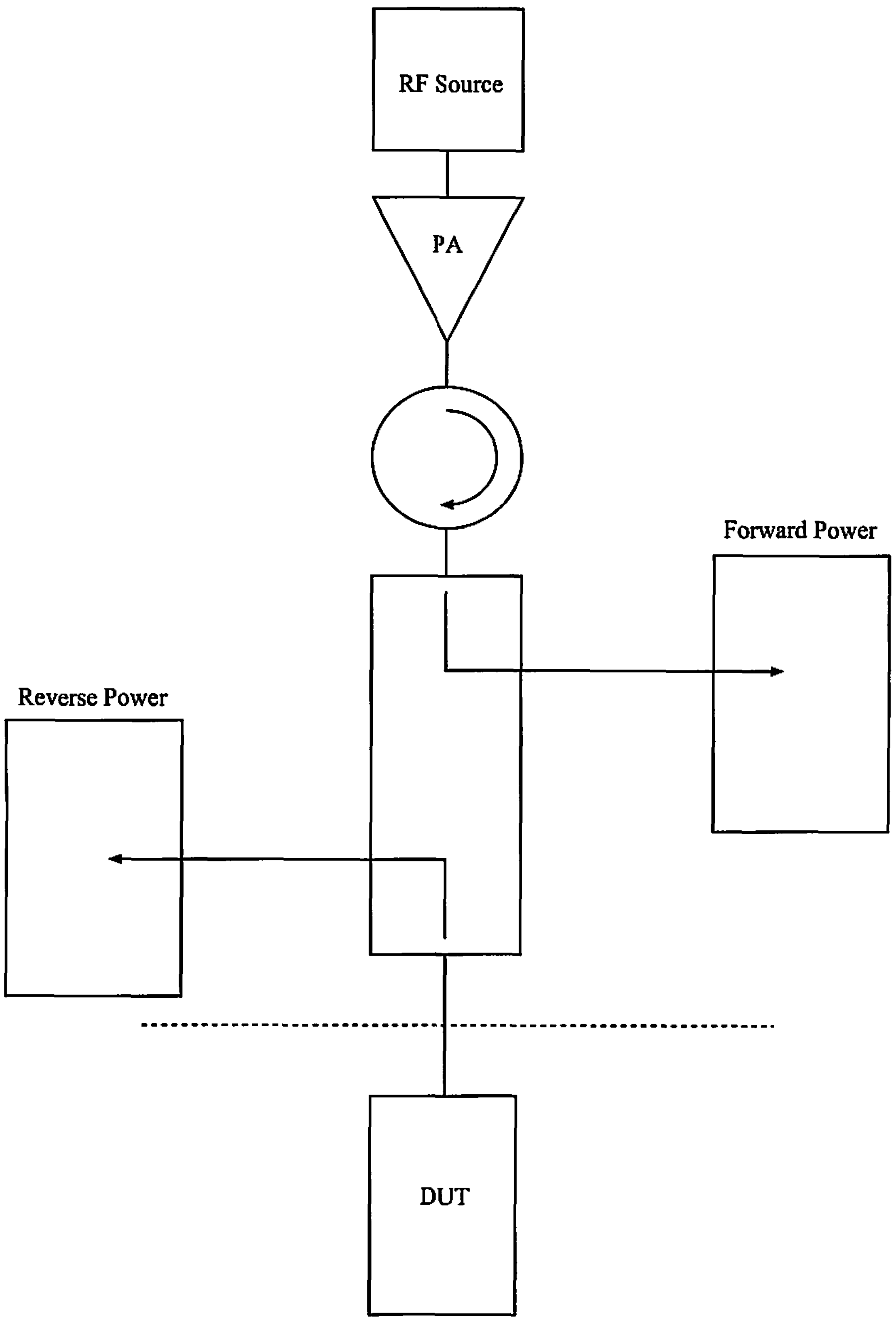

Shown in FIGS. 3(*a*) and 3(*b*) is a power dependent reflective load 11 of an assembly according to the invention. The reactive element 12 is a gas discharge tube. The power dependent reflective load 11 further comprises a tuning inductor 15 connected in series with the gas discharge tube. The power dependent reflective load 11 is connected in series with a resistive load 8.

In normal low frequency operation the tube 12 acts as a 1 G·Ohm resistor. At microwave frequencies the gas discharge tube 12 is a capacitor of around 0.7 pF in series with an inductor.

The self resonant frequency with the leads trimmed short is 1.979 GHz. The approximate Q blew 0.153 GHz at fc=1.979 GHz=13.

In the experimental set up the tuning inductor 15 is required to tune the power dependent reflective load to the correct frequency.

The center frequency of the network=1.9 GHz. The 50 Ohm load is rated to 150 W.

Figure 4B:
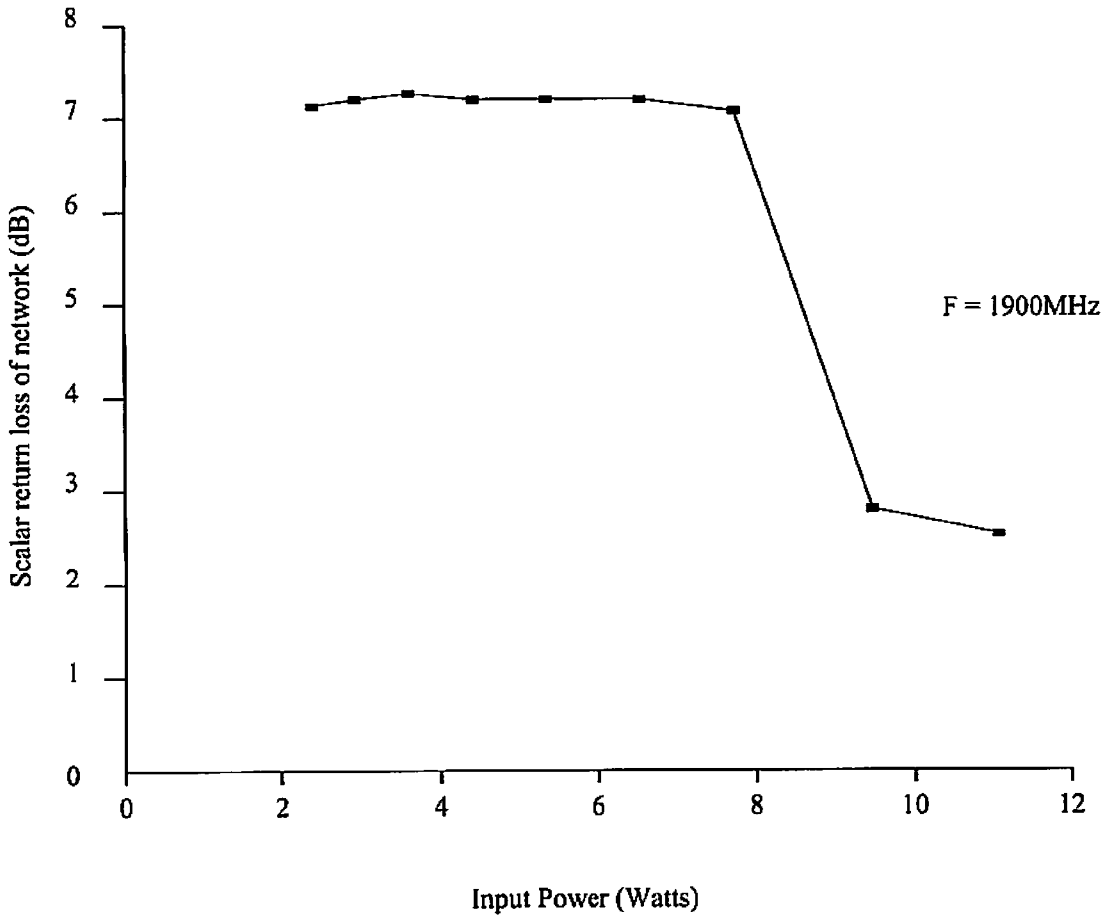

Shown in FIGS. 4(*a*) and 4(*b*) are the results of a first test. CW RF power is injected and the forward and reverse power levels are monitored. Fc=1.9 GHz CW.

As can be seen as the power levels increase the gas discharge tube 12 changes from a low impedance state to a high impedance state as required.

Figure 5B:
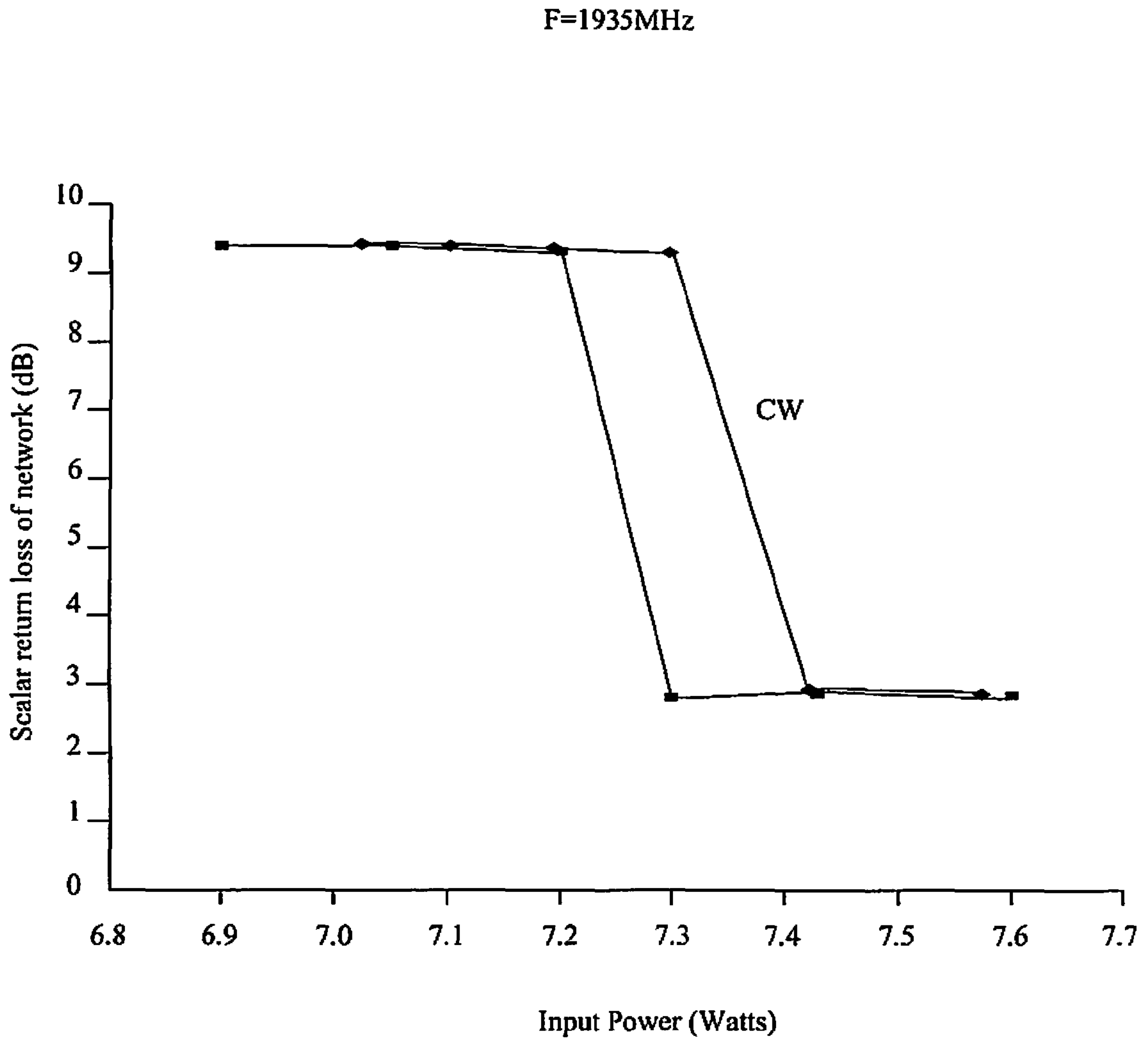

Shown in FIGS. 5(*a*) and 5(*b*) is the results of a further test. In this test a W-CDMA signal is used. In this test a 8.5 dB PAR 1 tone W-CDMA signal at 1935 MHz is used. As can be seen the device triggers on the average power level of the input signal, rather than the instantaneous peak power level.

Figure 6B:
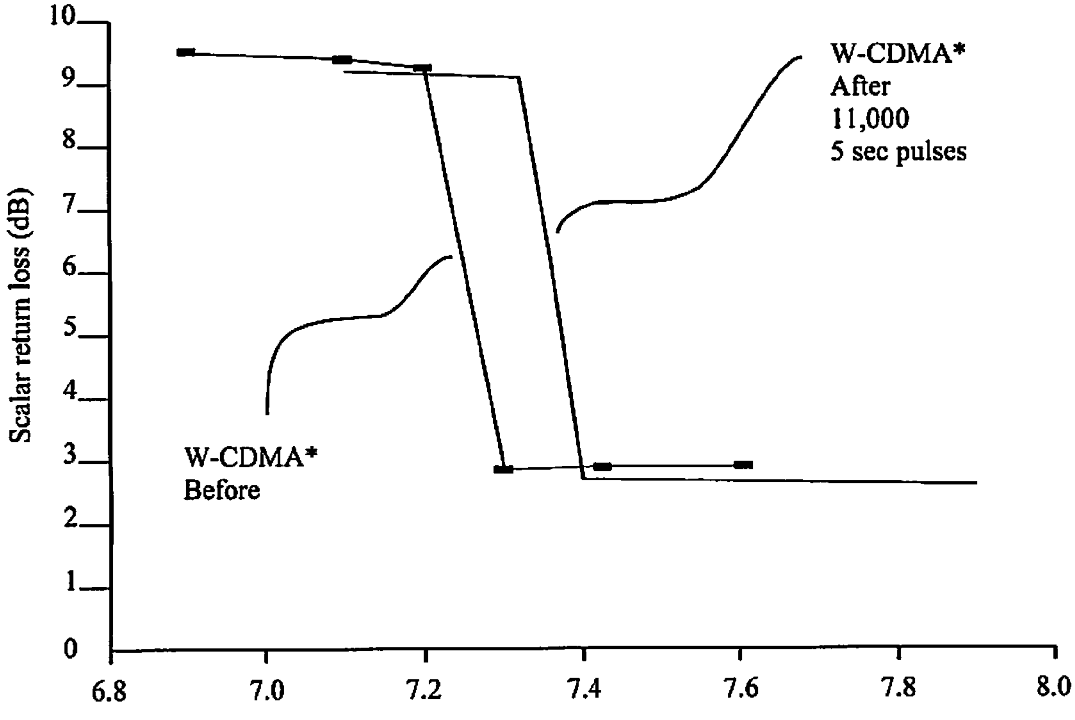

Shown in FIGS. 6(*a*) and 6(*b*) is the result of an ambient duration test. This comprised pulsing the input signal for 5 seconds above the threshold at which the discharge tube changes state every 20 seconds over the course of a weekend with W-CDMA single tone 8.5 dB PAR signal at ambient conditions.

Start time=18:00 Friday
Stop time=10:00 am Monday
Total number of hours=64 hours.
Total number of pulses=11,520.

The device was re-tested after this duration test. It was retested with a 8.5 dB PAR 1 tone W-CDMA signal at 1935 MHz.

A significant improvement in the return loss can be achieved by adding some shunt capacitance to the input of the network. The addition of a 1.2 pF capacitor improved return loss at 1.91 GHz to 30 dB. With the current set up (not optimised for center frequency) one can achieve better than 18 dB return loss over 70 MHz.

Figure 7:
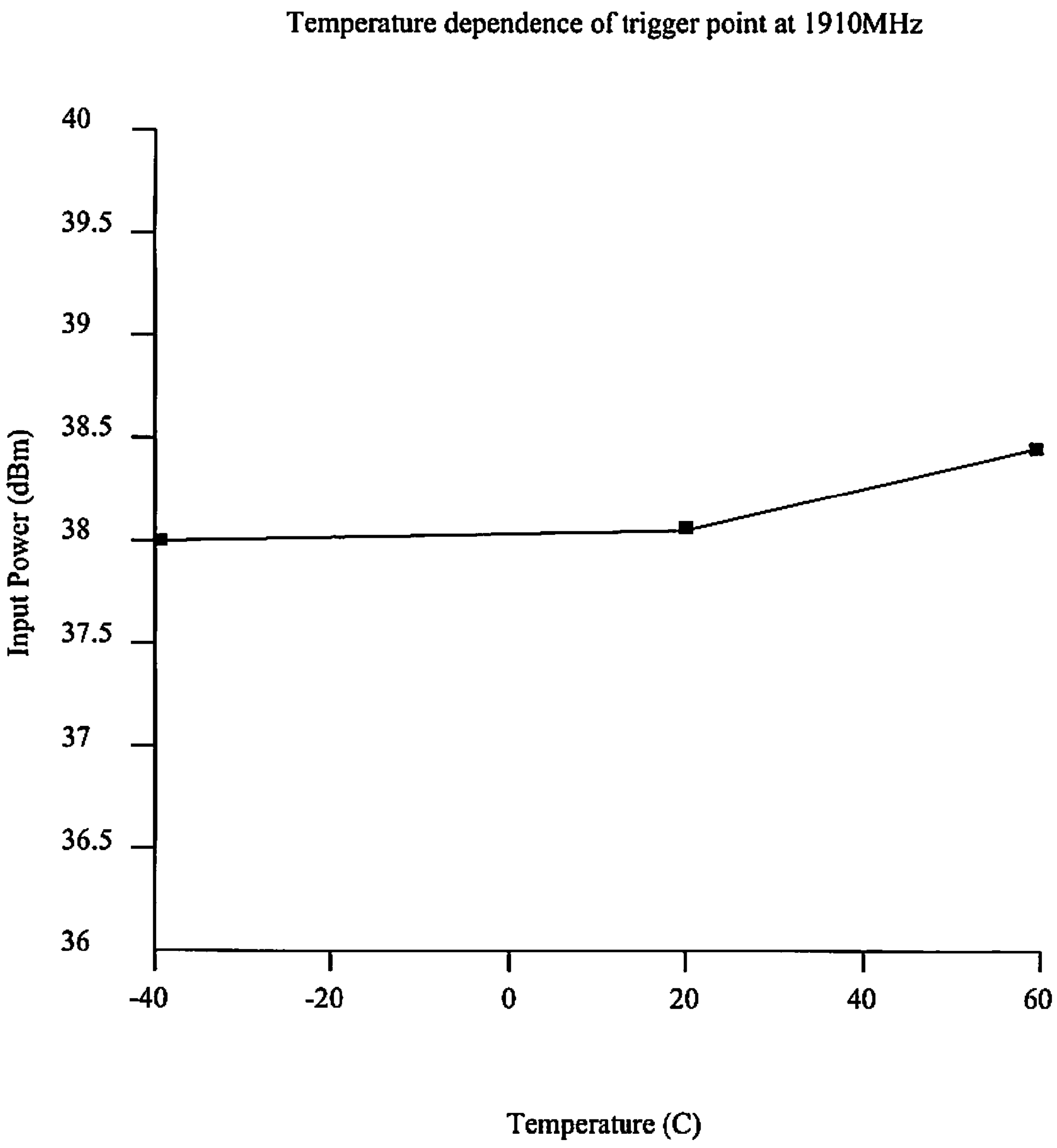
FIG. 7 shows the result of a further test on the load of FIG. 3(*a*)

Shown in FIG. 7 is the result of a test of performance over temperature. The details of the test are set out below—

Ambient 1:
ESG input power at switching=+3.10 dBm (arbitrary)
Input power at switching threshold=6.46 W
Scalar return loss before switching=29.3 dB
Scalar return loss after switching=4.03 dB
SS Return loss at 1.877 GHz=18.2 dB
SS Return loss at 1.984 GHz=18.2 dB Cold (−40 C)
ESG input power at switching=+3.10 dBm
Input power at switching threshold=6.36 W
Scalar return loss before switching=30.4 dB
Scalar return loss after switching=4.3 dB
SS Return loss at 1.877 GHz=18.5 dB
SS Return loss at 1.984 GHz=19.8 dB Hot (+55 C)
ESG input power at switching=+3.26 dBm
Input power at switching threshold=6.88 W
Scalar return loss before switching=28 dB
Scalar return loss after switching=4.3 dB
SS Return loss at 1.877 GHz=20.3 dB
SS Return loss at 1.984 GHz=18.0 dB As can be seen there is only a very minor dependence of the trigger point on temperature.

A harsher duration test was left running overnight to further test the robustness of the system.

Temperature=+70 C (15 C above max unit temp)
Input power +6 dB above rated for this particular device "ON" duration=15 seconds at +6 dB overdrive i.e Pin=+43 dBm (20 W)
Repeat period=30 seconds
i.e ON for 15 s OFF for 15 s second
Incident power=+21 W, reflected power=+6.95 W (RL=4.8 dB)
Power dissipated in network=21−6.95=14 W (No heat sinking—so particularly harsh test)
Single tone W-CDMA 8.5 dB PAR Estimated cycles~1860 for 15.5 hours
Start time=17:35
Stop time=08:30
Total time=1790
Re-measure ambient trigger point after harsh test—
Fc=1900 MHz
Before:

| | | |
|---|---|---|
| ESG input power at switching | +3.10 | dBm (arbitrary) |
| Input power at switching threshold | 6.46 | W |
| Scalar return loss before switching | 29.3 | dB |
| Scalar return loss after switching | 4.03 | dB |
| SS return loss at 1.877 GHz | 18.2 | dB |
| SS return loss at 1.984 GHz | 18.2 | dB |

After:

| | | |
|---|---|---|
| ESG input power at switching | +3.10 | dBm (arbitrary) |
| Input power at switching threshold | 6.72 | W |
| Scalar return loss before switching | 16.4 | dB |
| Scalar return loss after switching | 3.5 | dB |
| SS return loss at 1.877 GHz | 14.3 | dB |
| SS return loss at 1.984 GHz | 16.5 | dB |

In the above embodiment the power dependent reflective load 11 includes a tuning inductor 15. In alternative embodiments the reactive element 12 naturally oscillates at the correct frequency and a tuning inductor 15 may not be required.

In an alternative embodiment of the invention the reactive element 12 comprises an inductor 13 and capacitor 14 in series. In this embodiment a further tuning inductor 15 may not be required. The capacitor 14 is adapted such that its impedance drops, preferably substantially to zero, when the incident power exceeds the power limit In a further embodiment of the invention, the reactive element 12 comprises a commercial capacitor. The capacitor will not be an ideal component and so will have a small inductive component. In this embodiment a tuning inductor 15 is likely to be required.

Figure 8:
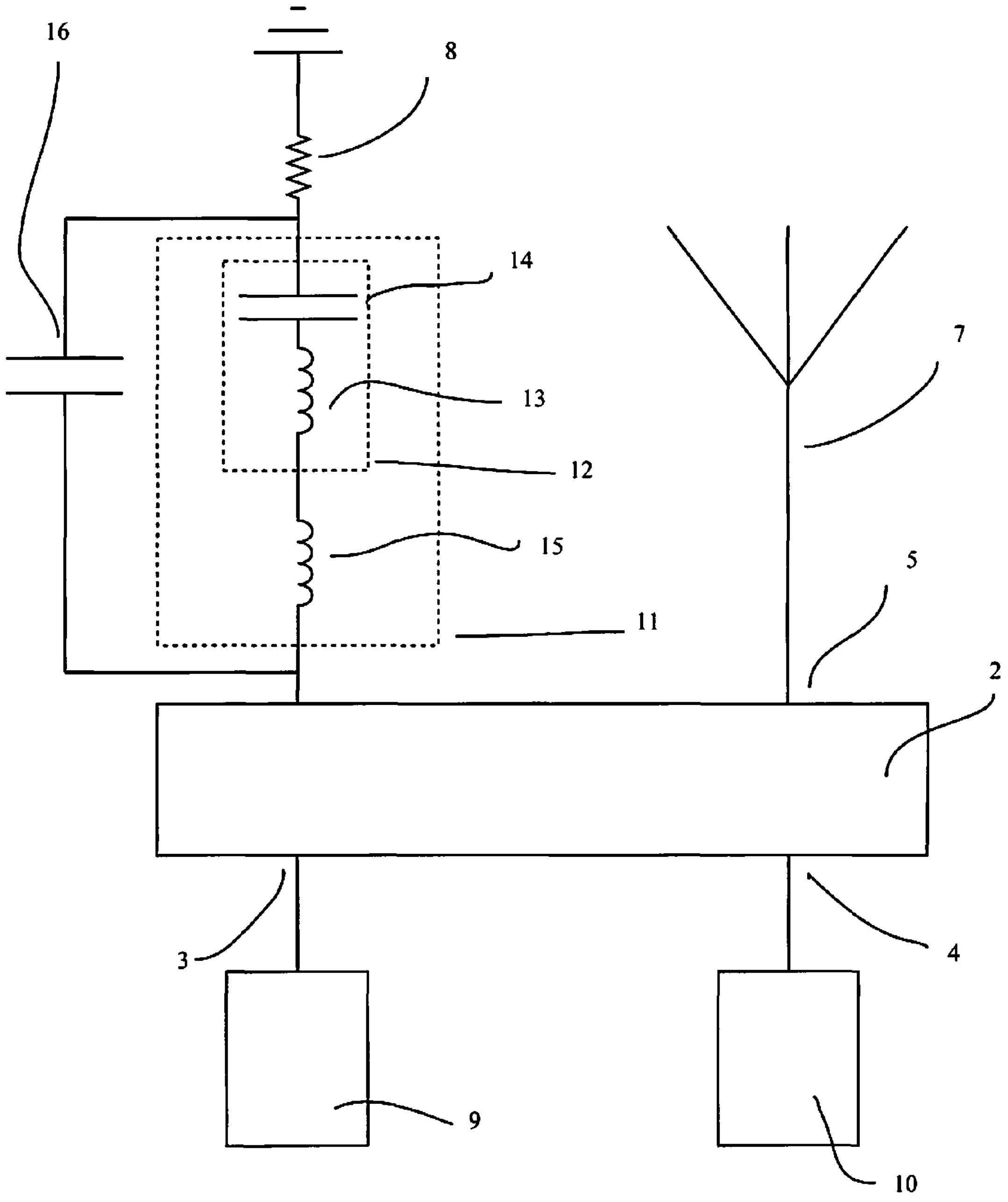
FIG. 8 shows a further embodiment of an assembly according to the invention.

Shown in FIG. 8 is a further embodiment of an assembly 1 according to the invention. In this embodiment an additional capacitor 16 is connected in parallel across the power dependent reflective load 11 in particular in parallel across the reactive element 12 and tuning inductor 15.

At low powers the power dependent reflective load 11 essentially behaves as a short circuit at the resonant frequency as described above. Connecting this additional capacitor 16 across the power dependent reflective load 11 therefore has no effect on the behavior of the circuit At high powers the power dependent reflective load 11 essentially behaves as an inductor. This in parallel with the additional capacitor 16 forms a resonant circuit. With the correct choice of additional capacitor 16 this is open circuit at around f1 and f2. The addition of the additional capacitor 16 reduces the return loss at powers above the power limit.

In the embodiment of FIG. 8 the reactive element 12 comprises a capacitor 14 and inductor 13 connected in series. As with other embodiments previously described the reactive element could alternatively comprise a gas discharge tube.

What is claimed is:

1. A microwave transmission assembly comprising:

a combiner comprising first and second input ports and internal and external output ports;

the combiner being adapted to transfer a signal received at microwave frequency $f_1$ at the first input port to the external output port and signals received at other frequencies to the internal output port;

the combiner being further adapted to transfer a signal at a microwave frequency $f_2$ at the second input port to the external output port and signals received at the other frequencies to the internal output port;

a resistive load connected to the internal output port; and, a power dependent reflective load connected in series with the resistive load, the power dependent reflective load comprising a reactive element, the reactive element comprising an inductive component and a capacitive component and being adapted to resonate at a load frequency;

the impedance of the capacitive component being adapted to drop when the incident microwave power received by the power dependent reflective load exceeds a power limit so switching the power dependent load from a low impedance state to a high impedance state.

2. A microwave transmission assembly as claimed in claim 1, wherein the magnitude of the impedance of the capacitive component is adapted to drop by at least one order of magnitude, preferably at least two orders of magnitude when the incident microwave power exceeds the power limit.

3. A microwave transmission assembly as claimed in claim 1, wherein the impedance of the capacitive component is adapted to drop substantially to zero when the incident microwave power exceeds the power limit.

4. A microwave transmission assembly as claimed in claim 1, further comprising an antenna for transmitting a microwave signal, the antenna being connected to the external output port.

5. A microwave transmission assembly as claimed in claim 1, wherein at least one of the input ports has a basestation connected thereto, the basestation being adapted to provide a microwave signal to the combiner.

6. A microwave transmission assembly as claimed in claim 5, wherein the power limit is at least 10% and less than 90% of the power of the microwave signal generated by the basestation, preferably greater than 20% and less than 75%.

7. A microwave transmission assembly as claimed in claim 5, wherein the base station comprises a detector for detecting power reflected from the combiner.

8. A microwave transmission assembly as claimed in claim 5, wherein the basestation is adapted to provide a modulated microwave signal, preferably a GSM, WCDMA, or LTE modulated signal.

9. A microwave transmission assembly as claimed in claim 1, wherein the reactive element can be modelled as a capacitor and an inductor in series, the impedance of the capacitor being adapted to drop in value, preferably to become a short circuit, at powers above the power limit.

10. A microwave transmission assembly as claimed in claim 1, wherein the reactive element comprises an inductor and a capacitor in series, the impedance of the capacitor being adapted to drop in value, preferably to become a short circuit, at powers above the power limit.

11. A microwave transmission assembly as claimed in claim 1, wherein the reactive element comprises a gas discharge tube.

12. A microwave transmission assembly as claimed in claim 1, wherein the power dependent reflective load further comprises a tuning inductor in series with the reactive element.

13. A microwave transmission assembly as claimed in claim 1, further comprising an additional capacitor connected in parallel with the power dependent reflective load.

14. A microwave transmission assembly as claimed in claim 13, wherein the additional capacitor is connected in parallel with the reactive element and a tuning inductor.

15. A microwave transmission assembly as claimed in claim 1, wherein the power dependent reflective load comprises a semiconductor device.

16. A microwave transmission assembly as claimed in claim 1, wherein the power dependent reflective load further comprises a step recovery diode.

17. A microwave transmission assembly as claimed in claim 1, wherein the inductance of the power dependent reflective load is at least one order of magnitude, preferably at least two orders of magnitude larger than the resistance of the resistive load.

* * * * *